(12) United States Patent
Kimura

(10) Patent No.: US 9,139,705 B2
(45) Date of Patent: Sep. 22, 2015

(54) RUBBER COMPOSITION AND METHOD FOR PRODUCING SAME

(71) Applicant: Toyo Tire & Rubber Co., Ltd., Osaka-shi, Osaka (JP)

(72) Inventor: Takayoshi Kimura, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/372,932

(22) PCT Filed: Dec. 6, 2012

(86) PCT No.: PCT/JP2012/081683
§ 371 (c)(1),
(2) Date: Jul. 17, 2014

(87) PCT Pub. No.: WO2013/140676
PCT Pub. Date: Sep. 26, 2013

(65) Prior Publication Data
US 2015/0011677 A1    Jan. 8, 2015

(30) Foreign Application Priority Data

Mar. 23, 2012 (JP) .................. 2012-067543

(51) Int. Cl.
*C08K 3/04* (2006.01)
*C08J 3/22* (2006.01)
*C08L 7/00* (2006.01)
*C08L 9/00* (2006.01)
*C08L 91/00* (2006.01)
*C08J 3/00* (2006.01)
*C08J 3/11* (2006.01)

(52) U.S. Cl.
CPC .. *C08J 3/22* (2013.01); *C08J 3/005* (2013.01); *C08J 3/11* (2013.01); *C08K 3/04* (2013.01); *C08L 7/00* (2013.01); *C08L 9/00* (2013.01); *C08L 91/00* (2013.01); *C08J 2307/02* (2013.01); *C08J 2409/00* (2013.01); *C08K 2201/006* (2013.01)

(58) Field of Classification Search
CPC .................................... C08K 3/04; C08J 3/22
See application file for complete search history.

(56) References Cited

U.S. PATENT DOCUMENTS

| | | | |
|---|---|---|---|
| 8,053,496 B1 | 11/2011 | Minouchi et al. | |
| 8,110,620 B1* | 2/2012 | Minouchi | 523/351 |
| 2003/0088006 A1 | 5/2003 | Yanagisawa et al. | |
| 2005/0272850 A1* | 12/2005 | Jois et al. | 524/484 |
| 2011/0021664 A1 | 1/2011 | Wang et al. | |
| 2011/0207857 A1 | 8/2011 | Sakai | |

FOREIGN PATENT DOCUMENTS

| | | |
|---|---|---|
| JP | 61-268740 A | 11/1986 |
| JP | 61-268743 A | 11/1986 |
| JP | 08-269243 A | 10/1996 |
| JP | 09-132671 A | 5/1997 |
| JP | 2004-099625 A | 4/2004 |
| JP | 2004-107482 A | 4/2004 |
| JP | 2009-256550 A | 11/2009 |
| JP | 2011-016874 A | 1/2011 |
| JP | 2011-511148 A | 4/2011 |
| JP | 4738551 B1 | 8/2011 |
| JP | 2011-168719 A | 9/2011 |

\* cited by examiner

*Primary Examiner* — Vickey Nerangis
(74) *Attorney, Agent, or Firm* — Westerman, Hattori, Daniels & Adrian, LLP

(57) ABSTRACT

A rubber composition obtained by dry-mixing a natural rubber wet master batch yielded by mixing at least a natural rubber latex and a carbon-black-containing slurry solution with each other in a liquid phase and drying the resultant mixture, a dry rubber made mainly of a polybutadiene rubber, and an oil, wherein when the total amount of rubber components in the rubber composition is regarded as 100 parts by mass, the natural rubber is contained in an amount of 50 parts or more by mass, and the polybutadiene rubber is contained in an amount of 20 to 50 parts by mass, and the oil has a pour point of −10 C or lower, and an aniline point of 90 C or higher, and the blend amount of the oil is from 15 to 40 parts by mass for 100 parts by mass of the rubber components.

10 Claims, No Drawings

RUBBER COMPOSITION AND METHOD FOR PRODUCING SAME

TECHNICAL FIELD

The present invention relates to a rubber composition, and a method for producing the same, specifically, a rubber composition that can be largely decreased in E' storage elastic modulus in a low temperature range, can be greatly improved, particularly, in braking performance on an ice and snow road surface (referred to also as an "ice road surface" hereinafter) when used as a raw material for tires, for example, their treads, and can be further improved in low-thermogenic performance.

BACKGROUND ART

Rubbers for treads of studless tires used for running on ice road surfaces are required to have excellent on-ice and on-snow performances. In order to improve tires in frictional performances on ice road surfaces, for example, the following method has been hitherto adopted: a method of not only using a polybutadiene rubber, which is low in glass transition temperature, or blending a softening agent, such as oil, into a tread rubber to maintain a low hardness of the tread rubber even at low temperatures, thereby improving the rubber in hysteresis frictional performance, but also blending a hard material such as hollow particles, glass fiber or plant granular material thereinto, thereby improving the rubber in scratch frictional performance. In order to improve the tread rubber, particularly, in gripping performance on a wetting road surface (referred to also as a "wet road surface" hereinafter), a method is adopted in which the blend proportion of a filler or a softening agent such as oil is increased in the composition of the rubber. However, a vulcanized rubber obtained therefrom tends to be lowered in low-thermogenic performance and abrasion resistance.

Apart from the above, in the rubber industry, known is the use of a natural rubber wet master batch for improving a rubber composition containing a filler, such as carbon black, in workability when this composition is produced, or in filler dispersibility therein (for example, Patent Document 1 listed below). This is a technique of: mixing, in a liquid phase, a natural rubber latex with a filler-containing slurry solution obtained by mixing a filler and a dispersing solvent with each other at a predetermined ratio beforehand and then dispersing the filler into the dispersing solvent by mechanical force; subsequently adding a solidifier such as an acid to the mixture to solidify the mixture; collecting the solidified product; and then drying the product. The use of the natural rubber wet master batch gives a rubber composition better in filler dispersibility therein and in rubber physical properties such as workability and reinforceability as compared with the use of a rubber dry master batch obtained by dry-mixing a filler with a rubber.

Patent Document 2 listed below describes a rubber composition for ice-and-snow-road tire treads which contains: a natural rubber wet master batch containing a carbon black having a nitrogen adsorption specific surface area of 105 to 155 m²/g, and a CTAB adsorption specific surface area of 100 to 150 m²/g; and a polybutadiene rubber.

Furthermore, Patent Document 3 listed below states that a rubber wet master batch which is one wherein a filler is evenly dispersed and the filler is restrained from being re-aggregated with time, and which is usable as a raw material for a vulcanized rubber excellent in low-thermogenic performance, endurance and rubber strength can be produced by a rubber-wet-master-batch-producing method including step (I) of adding, when the filler is dispersed into a dispersing solvent, at least one portion of a rubber latex solution thereto, thereby producing a slurry solution containing the filler to which rubber latex particles adhere, step (II) of mixing this slurry solution with the rest of the rubber latex solution to produce a rubber latex solution containing the just-above described rubber-latex-particle-adhering filler, and step (III) of solidifying and drying the rubber latex solution containing the rubber-latex-particle-adhering filler.

PRIOR ART DOCUMENTS

Patent Documents

Patent Document 1: JP-A-2004-99625
Patent Document 2: JP-A-2004-107482
Patent Document 3: Japanese Patent No. 4738551

SUMMARY OF THE INVENTION

Problems to be Solved by the Invention

However, the inventor has made eager investigations so that a vulcanized rubber from the rubber composition described in each of Patent Documents 1 and 2 has turned out to be raised in E' in a low temperature range so as to be deteriorated in braking performance on an ice road surface, and be also deteriorated in low-thermogenic performance.

The rubber-wet-master-batch-containing rubber composition described in Patent Document 3 is excellent in filler dispersibility therein, and is improved in low-thermogenic performance. However, it has become evident that when this rubber composition is used for, for example, a tire tread, there remains room for a further improvement in braking performance, particularly, on ice road surfaces.

In light of this actual situation, the present invention has been made. An object thereof is to provide a rubber composition that can be largely decreased in E' in a low temperature range, can be greatly improved, particularly, in braking performance on an ice and snow road surface when used as a raw material for tires, for example, their treads, and can be further improved in low-thermogenic performance; and a method for producing the composition.

Means for Solving the Problems

The object can be attained by the present invention as described hereinafter. Accordingly, the present invention relates to a rubber composition obtained by dry-mixing a natural rubber wet master batch yielded by mixing at least a natural rubber latex and a carbon-black-containing slurry solution with each other in a liquid phase and drying the resultant mixture, a dry rubber made mainly of a polybutadiene rubber, and an oil, wherein when the total amount of rubber components in the rubber composition is regarded as 100 parts by mass, the natural rubber is contained in an amount of 50 parts or more by mass, and the polybutadiene rubber is contained in an amount of 20 to 50 parts by mass, and the oil has a pour point of −10° C. or lower, and an aniline point of 90° C. or higher, and the blend amount of the oil is from 15 to 40 parts by mass for 100 parts by mass of the rubber components.

Since the rubber composition according to the present invention is a composition obtained by dry-mixing the natural rubber wet master batch with the dry rubber, which is made mainly of the polybutadiene rubber, at the specific ratio, the composition is excellent in carbon black dispersibility therein and can be decreased in E' in a low temperature range. Furthermore, the specific amount of the oil having specific physical properties (the pour point and the aniline point) is blended into the composition; thus, the composition can keep the rubber hardness thereof at a low level even in a low temperature range to be improved in braking performance on ice road surfaces. When the natural rubber wet master batch is, particularly, a master batch produced through the following steps, the rubber composition is especially excellent in filler dispersibility therein: step (I) in which when a carbon black is dispersed into a dispersing solvent to prepare the carbon-black-containing slurry solution, at least one portion of the natural rubber latex is added thereto, thereby producing a slurry solution containing the carbon black to which natural rubber latex particles adhere, step (II) of mixing this slurry solution with the rest of the natural rubber latex to produce a natural rubber latex solution containing the just-above described natural-rubber-latex-particle-adhering carbon black, and step (III) of solidifying and drying the natural rubber latex solution containing the natural-rubber-latex-particle-adhering carbon black. Consequently, when these rubber components are used together with the specific oil, the composition is improved, with an especially good balance, in braking performance on ice road surfaces and low-thermogenic performance.

As described above, a vulcanized rubber from the rubber composition according to the present invention is excellent in low-thermogenic performance, and further in braking performance on ice road surfaces. Accordingly, the rubber composition according to the present invention is particularly useful as a rubber composition for studless tires.

In the rubber composition, it is preferred that the natural rubber wet master batch contains the carbon black in an amount of 40 to 70 parts by mass for 100 parts by mass of the rubber components of the master batch. It is more preferred that the carbon black contained in the natural rubber wet master batch has a nitrogen adsorption specific surface area ($N_2SA$) of 100 $m^2/g$ or less. According to this form, the rubber composition is further improved in low-thermogenic performance and can keep the viscosity thereof at a low level to be also excellent in workability.

When the total amount of the present rubber components in the rubber composition is regarded as 100 parts by mass, further when the total amount of the present rubber components in the rubber composition is regarded as 100 parts by mass, at least one of a plant granular material, a grain granular material, and a granular region of a grain core material may be further contained in an amount of 0.5 to 10 parts by mass. In this case, the vulcanized rubber is improved in scratch frictional performance to be further improved in braking performance on ice road surfaces.

Additionally, the present invention relates to a method for producing a rubber composition comprising a natural rubber wet master batch obtained by use of a carbon black, a dispersing solvent and a natural rubber latex as raw materials, a dry rubber made mainly of a polybutadiene rubber, and an oil, including: step (I) in which when the carbon black is dispersed into the dispersing solvent, at least one portion of the natural rubber latex is added thereto, thereby producing a slurry solution containing the carbon black to which natural rubber latex particles adhere, step (II) of mixing this slurry solution with the rest of the natural rubber latex solution to produce a natural rubber latex solution containing the just-above described natural-rubber-latex-particle-adhering carbon black, step (III) of solidifying the rubber latex solution containing the natural-rubber-latex-particle-adhering carbon black to produce the carbon-black-containing natural rubber solidified product, and then drying the solidified product to produce a natural rubber wet master batch, and step (IV) of dry-mixing this natural rubber wet master batch with the dry rubber, which is made mainly of the polybutadiene rubber, and the oil, wherein when the total amount of rubber components in the rubber composition is regarded as 100 parts by mass, the natural rubber is contained in an amount of 50 parts or more by mass, and the polybutadiene rubber is contained in an amount of 20 to 50 parts by mass, and the oil has a pour point of −10° C. or lower, and an aniline point of 90° C. or higher, and the blend amount of the oil is from 15 to 40 parts by mass for 100 parts by mass of the rubber components. This producing method makes it possible to produce a rubber composition improved, with an especially good balance, in braking performance on ice road surfaces, and low-thermogenic performance.

In this producing method, it is preferred that: the step (III) has at least a dehydrating step (III-A) of using a first uniaxial extruder to dehydrate the carbon-black-containing natural rubber solidified product while the product is heated up to 100 to 180° C., thereby producing a natural rubber wet master batch, and a drying plasticizing step (III-B) of using a second uniaxial extruder to plasticize the natural rubber wet master batch while the master batch is heated up to 120 to 180° C., thereby producing the just-above described natural rubber wet master batch further decreased in water content by percentage; and this rubber composition producing method has no cooling step between the dehydrating step (III-A) and the drying plasticizing step (III-B).

According to this producing method, the first uniaxial extruder is used to dehydrate the carbon-black-containing natural rubber solidified product while the product is heated up to 100 to 180° C., thereby producing a natural rubber wet master batch (the dehydrating step (III-A)); thus, the water content by percentage in the resultant natural rubber wet master batch can be efficiently decreased while the applied heat capacity and mechanical energy are restrained as much as possible. Furthermore, the second uniaxial extruder is used to plasticize this natural rubber wet master batch while the master batch is heated up to 120 to 180° C. (the drying plasticizing step (III-B)), thereby making it possible to produce the natural rubber wet master batch which is further decreased in water content by percentage and is hardly rubber-deteriorated. As a result, a rubber composition can be finally obtained which is improved in rubber physical properties, such as tearing resistance and stress property in its high-strain region.

For example, if the natural rubber wet master batch after the dehydrating step (III-A) is cooled down to room temperature not later than the drying plasticizing step (III-B), a larger heat capacity and mechanical energy would be given to the natural rubber wet master batch when the drying plasticizing step (III-B) is performed. However, the present producing method has no cooling step between the dehydrating step (III-A) and the drying plasticizing step (III-B); thus, the water content by percentage in the resultant natural rubber wet master batch can be efficiently decreased while the heat capacity and mechanical energy applied to the master batch are restrained as much as possible. A manner for preventing the natural rubber wet master batch from being cooled between the dehydrating step (III-A) and the drying plasticizing step (III-B) may be, for example, a manner of connecting the first uniaxial extruder and the second uniaxial extruder to each other. The "cooling step" referred to in the present invention denotes, for example, a step in which the rubber wet master batch after the dehydrating step is cooled to a temperature of 40° C. or lower; and denotes, in a broader sense, a step in which the master batch is cooled to a temperature of 60° C. or lower.

In the present rubber composition producing method, the water content by percentage of the natural rubber wet master batch obtained through the dehydrating step (III-A) is preferably from 1 to 10%. The water content by percentage of the natural rubber wet master batch obtained through the drying plasticizing step (III-B) is preferably 0.9% or less. Ina case where in the present invention a drying process extending over the two stages (the dehydrating step (III-A) and the drying plasticizing step (III-B)) is performed, and further the water content by percentage after each of the steps is set in the range described just above, the rubber wet master batch can be efficiently decreased in water content by percentage while a vulcanized rubber to be finally obtained therefrom is certainly prevented from being rubber-deteriorated.

In the rubber composition producing method, it is preferred that in the drying plasticizing step (III-B), a mechanical energy of 70 W/kg or less is applied to the rubber wet master batch inside the second uniaxial extruder. In this case, the final vulcanized rubber can be prevented from being rubber-deteriorated with a higher certainty while the water content by percentage is efficiently decreased.

In the rubber composition producing method, it is preferred that when the natural rubber wet master batch is plasticized in the drying plasticizing step (III-B), an anti-aging agent is added and blended thereinto. In this case, the anti-aging agent can be more evenly dispersed in the natural rubber wet master batch, so that the final vulcanized rubber can be prevented from being rubber-deteriorated with an even higher certainty. In the natural rubber wet master batch that has undergone the dehydrating step (III-A), the water content by percentage is decreased; thus, at the time of the drying plasticizing step (III-B), it hardly happens that the anti-aging agent flows out with the volatilization of water.

In the rubber composition producing method, it is preferred that the step (III) includes, after the drying plasticizing step (III-B), a shaping plasticizing step (III-C) of using a mixer further to plasticize the natural rubber wet master batch. In the shaping plasticizing step (III-C), it is more preferred that a mechanical energy of 70 W/kg or less is applied to the rubber wet master batch inside the mixer. In this case, the water content by percentage can be more efficiently decreased while the final vulcanized rubber is certainly prevented from being rubber-deteriorated. The mixer may be, for example, an open roll or a uniaxial extruder.

Mode for Carrying out the Invention

About the rubber composition according to the present invention, as a raw material thereof, a natural rubber wet master batch is used which is yielded by mixing at least a natural rubber latex and a carbon-black-containing slurry solution with each other in a liquid phase and drying the resultant mixture. It is preferred to use, particularly, a natural rubber wet master batch produced through the following steps since the rubber composition is remarkably good in carbon black dispersibility therein and a vulcanized rubber therefrom is improved in low-thermogenic performance: step (I) in which when a carbon black is dispersed into a dispersing solvent to prepare the carbon-black-containing slurry solution, at least one portion of the natural rubber latex is added thereto, thereby producing a slurry solution containing the carbon black to which natural rubber latex particles adhere, step (II) of mixing this slurry solution with the rest of the natural rubber latex to produce a natural rubber latex solution containing the just-above described natural-rubber-latex-particle-adhering carbon black, and step (III) of solidifying and drying the natural rubber latex solution containing the natural-rubber-latex-particle-adhering carbon black.

The natural rubber latex solution is a natural product produced by a metabolism effect of a plant, and is in particular preferably a natural rubber/water system solution, in which a dispersing solvent therein is water. The number-average molecular weight of a natural rubber in the natural rubber latex used in the present invention is preferably 2,000,000 or more, more preferably 2,500,000 or more. About the natural rubber latex, a concentrated latex, and a fresh latex called a field latex are usable without any discrimination. When the total amount of the rubber components in the rubber composition is regarded as 100 parts by mass, it is preferred that the natural rubber (solid) is contained in an amount of 50 parts or more by mass.

The carbon black may be any carbon black species usable in an ordinary rubber industry, such as SAF, ISAF, HAF, FEF or GPF, or may be any electroconductive carbon black species such as acetylene black or Ketjenblack. The carbon black may be a granulated carbon black species, which has been granulated, considering the handleability thereof in an ordinary rubber industry, or a non-granulated carbon black species.

In the case of using, as the carbon black, one having a nitrogen adsorption specific surface area ($N_2SA$) of 100 m$^2$/g or less, the resultant vulcanized rubber is more remarkably good in low-thermogenic performance, and further the rubber composition can keep the viscosity thereof at a low level to be also remarkably good in workability, which is preferred.

The dispersing solvent is in particular preferably water, and may be, for example, water containing an organic solvent.

Hereinafter, a description will be made about the natural rubber wet master batch produced through the steps (I) to (III).

(1) Step (I)

The step (I) is a step of adding, when a carbon black is dispersed into a dispersing solvent, at least one portion of a natural rubber latex thereto, thereby producing a slurry solution containing the carbon black to which natural rubber latex particles adhere. It is allowable to mix the natural rubber latex beforehand with the dispersing solvent, and then add the carbon black thereto to disperse the carbon black therein. It is also allowable to add the carbon black into the dispersing solvent, and next disperse the carbon black in the dispersing solvent while the natural rubber latex is added thereto at a predetermined adding speed; or add the carbon black into the dispersing solvent, and next disperse the carbon black in the dispersing solvent while multiple divided fractions of the natural rubber latex are added thereto, these fractions being equal to each other in volume. By dispersing the carbon black into the dispersing solvent in the state that the natural rubber latex is present, the above-mentioned slurry solution can be produced, which contains the natural-rubber-latex-particle-adhering carbon black. In the step (I), the addition amount of the natural rubber latex is, for example, from 0.075 to 12% by mass of the whole of the used natural rubber latex (the total of the amounts added in the steps (I) and (II)).

In the step (I), in the added natural rubber latex, the percentage by mass of the solid (rubber) to the carbon black therein is preferably from 0.25 to 15%, more preferably from 0.5 to 6% by mass. The solid (rubber) concentration in the added natural rubber latex is preferably from 0.2 to 5% by mass, more preferably from 0.25 to 1.5% by mass. In these cases, a rubber wet master batch can be produced which is heightened in carbon black dispersibility therein while the natural rubber latex particles are certainly caused to adhere onto the carbon black.

The method in the step (I) for mixing the carbon black with the dispersing solvent in the presence of the natural rubber latex may be a method of using an ordinary disperser, such as a high-shearing mixer, a High Shear Mixer, a homo-mixer, a ball mill, a bead mill, a high-pressure homogenizer, an ultrasonic homogenizer or a colloid mill, to disperse the carbon black.

The "high-shearing mixer" denotes a mixer having a rotor rotatable at a high velocity and a fixed stator in which the rotor is rotated in the state that a precise clearance is set between the rotor and the stator, whereby a high-shearing effect acts. In order to generate such a high-shearing effect, it is preferred to set the clearance between the rotor and the stator, and the peripheral velocity of the rotor to 0.8 mm or less, and 5 m/s or more, respectively. Such a high-shearing mixer may be a commercially available product. An example thereof is a product "High Shear Mixer" manufactured by Silverson.

In the case of mixing the carbon black and the dispersing solvent with each other in the presence of the natural rubber latex in the present invention to produce the slurry solution containing the natural-rubber-latex-particle-adhering carbon black, a surfactant may be added thereto to improve the carbon black in dispersibility. The surfactant may be a surfactant known in the rubber industry. Examples thereof include nonionic surfactants, anionic surfactants, cationic surfactants, and amphoteric surfactants. Instead of the surfactant or in addition to the surfactant, an alcohol such as ethanol may be used. However, it is feared that the use of the surfactant is to make rubber properties of the final vulcanized rubber low. Thus, the blend amount of the surfactant is preferably 2 parts or less by mass, more preferably 1 part or less by mass for 100 parts by mass of the solid (rubber) in the natural rubber latex. It is preferred not to use any surfactant substantially. In order to restrain a deterioration of the solid (rubber) in the natural rubber latex in the steps (I) and (II), an anti-aging agent may be added thereto. The anti-aging agent may be an anti-aging agent known in the rubber industry. Examples thereof include amine type, phenol type, organic phosphite type, and thioether type agents.

About the natural-rubber-latex-particle-adhering carbon black in the slurry solution produced in the step (I), the 90% volume particle size (μm) ("D90") is preferably 31 μm or more, more preferably 35 μm or more. In this case, the carbon black is excellent in dispersibility in the slurry solution and can be further prevented from being re-aggregated, so that the slurry solution is excellent in storage stability and further the final vulcanized rubber is also excellent in low-thermogenic performance, endurance and rubber strength. In the present invention, the D90 of the natural-rubber-latex-particle-adhering carbon black means a value obtained by making a measurement about the carbon black plus the adhering natural rubber latex particles.

(2) Step (II)

The step (II) is a step of mixing the slurry solution with the rest of the natural rubber latex to produce a rubber latex solution containing the natural-rubber-latex-particle-adhering carbon black. The method for mixing the slurry solution with the rest of the natural rubber latex in a liquid phase is not particularly limited, and may be a method of using an ordinary disperser, such as a high-shearing mixer, a High Shear Mixer, a homo-mixer, a ball mill, a bead mill, a high-pressure homogenizer, an ultrasonic homogenizer or a colloid mill, to mix the slurry solution with the rest of the natural rubber latex solution. At the time of the mixing, the whole of the mixing system, such as the disperser, may be optionally heated.

In the rest of the natural rubber latex, the solid (rubber) concentration is preferably higher than in the natural rubber latex added in the step (I) when the drying period and labor thereof in the next step (III) are considered. Specifically, the solid (rubber) concentration is preferably from 10 to 60% by mass, more preferably from 20 to 30% by mass.

(3) Step (III)

The step (III) is a step of solidifying the rubber latex solution containing the natural-rubber-latex-particle-adhering carbon black to produce a carbon-black-containing rubber solidified product. The method for the solidification is, for example, a method of incorporating a solidifier into the rubber latex solution containing the natural-rubber-latex-particle-adhering carbon black to solidify the latex solution.

The solidifier used in the solidifying step may be an acid, such as formic acid or sulfuric acid, or a salt, such as sodium chloride, that is usable usually for solidifying a rubber latex solution.

In the natural rubber wet master batch obtained through step (III), it is preferred about the ratio between the rubber components and the carbon black that the filler is contained in an amount of 40 to 70 parts by mass for 100 parts by mass of the rubber (solid). This case makes it possible to produce a natural rubber wet master batch which is improved, with a good balance, in carbon black dispersibility therein, and in low-thermogenic performance and endurance to be attained when the master batch is finally made into a vulcanized rubber.

The rubber composition according to the present invention is a composition obtained by dry-mixing the above-mentioned natural rubber wet master batch with a dry rubber made mainly of a polybutadiene rubber, and an oil.

The species of the polybutadiene rubber (BR) may be a species synthesized, using a cobalt (Co) catalyst, neodymium (Nd) catalyst, nickel (Ni) catalyst, titanium (Ti) catalyst, or lithium (Li) catalyst; or a species synthesized, using a polymerization catalyst composition containing a metallocene complex described in WO 2007/129670. In order to improve the rubber composition in abrasion resistance, workability, tearing resistance and low-thermogenic performance with a good balance, it is preferred to blend thereinto a polybutadiene rubber having a mass-average molecular weight of 350,000 to 1,000,000. It is particularly preferred to blend thereinto a polybutadiene rubber having a mass-average molecular weight of 350,000 to 1,000,000 and a cis-1,4-isomer content of 95% or more. When the total amount of the rubber composition is regarded as 100 parts by mass, the blend amount of the polybutadiene rubber is set preferably into the range of 20 to 50 parts by mass.

As far as the rubber composition in the present invention contains at least not only 50 parts or more by mass of the natural rubber but also 20 to 50 parts by mass of the polybutadiene rubber in 100 parts by mass of the rubber components, a rubber different from any polybutadiene rubber may be blended as another species of the dry rubber. Examples of the blendable different rubber include polyisoprene rubber (IR), polystyrenebutadiene rubber (SBR), chloroprene rubber (CR), and nitrile rubber (NBR). These may be used alone or in the form of a blend of two or more thereof.

The oil used in the present invention is an oil having a pour point of −10° C. or lower, and an aniline point of 90° C. or higher. By blending, in the rubber composition, this oil, the natural rubber wet master batch, and the polybutadiene rubber at a ratio in the specific range, the rubber composition is largely improved in braking performance on ice road surfaces and low-thermogenic performance when used as a raw material for tires, for example, their treads. As this oil, a commercially available product is also suitably usable. Examples thereof include a product "PROCESS P200" (pour point: −15° C., aniline point: 102.3° C.) manufactured by JOMO, and a product "PS-32" (pour point: −20° C., aniline point: 110° C.) manufactured by Idemitsu Kosan Co., Ltd. The blend amount of the oil in the rubber composition is preferably from 15 to 40 parts by mass.

The rubber composition according to the present invention can be produced by, for example, a rubber composition producing method including step (I) in which when a carbon black is dispersed into a dispersing solvent, at least one portion of a natural rubber latex is added thereto, thereby producing a slurry solution containing the carbon black to which natural rubber latex particles adhere, step (II) of mixing this slurry solution with the rest of the natural rubber latex solution to produce a natural rubber latex solution containing the just-above described natural-rubber-latex-particle-adhering carbon black, step (III) of solidifying the rubber latex solution containing the natural-rubber-latex-particle-adhering carbon black to produce a carbon-black-containing natural rubber solidified product, and then drying the solidified product to produce a natural rubber wet master batch, and step (IV) of dry-mixing this natural rubber wet master batch with a dry rubber made mainly of a polybutadiene rubber, and an oil, wherein when the total amount of rubber components in the rubber composition is regarded as 100 parts by mass, the natural rubber is contained in an amount of 50 parts or more by mass, and the polybutadiene rubber is contained in an amount of 20 to 50 parts by mass, and the oil has a pour point of −10° C. or lower, and an aniline point of 90° C. or higher, and the blend amount of the oil is from 15 to 40 parts by mass for 100 parts by mass of the rubber components.

It is particularly preferred that the step (III) has at least the following dehydrating step (III-A) and drying plasticizing step (III-B) and no cooling step is set between the dehydrating step (III-A) and the drying plasticizing step (III-B): the dehydrating step (III-A) of using a first uniaxial extruder to dehydrate the carbon-black-containing natural rubber solidified product while the product is heated up to 100 to 180° C., thereby producing a natural rubber wet master batch; and the drying plasticizing step (III-B) of using a second uniaxial extruder to plasticize the natural rubber wet master batch while the master batch is heated up to 120 to 180° C., thereby producing the natural rubber wet master batch further decreased in water content by percentage. This case makes an improvement of a vulcanized rubber from the resultant rubber composition in rubber physical properties such as tearing resistance and high-strain-region stress property. Hereinafter, the step (III) will be detailed.

Dehydrating Step (III-A):

The dehydrating step (III-A) is a step of using a first uniaxial extruder to dehydrate the carbon-black-containing natural rubber solidified product while the product is heated up to 100 to 180° C., thereby producing a natural rubber wet master batch. The first uniaxial extruder may be any uniaxial extruder usable in an ordinary rubber industry. The barrel diameter (D), the barrel length (L), and further the ratio of the barrel length to the barrel diameter (L/D) may be set at will. The gap width (slit width) between the inner wall of the barrel and its screw is preferably from 0.1 to 0.9 mm. In the present invention, it is preferred to use a uniaxial extruder having no pin portions projected inward from the barrel inner wall of a discharging port side region (expander region) of the uniaxial extruder. If the expander region has pin portions, a high shearing force acts onto the rubber components passing by the pin portions so that polymer chains in the rubber components are cleaved. Thus, deterioration of the rubber components advances easily. As a result, the vulcanized rubber to be finally obtained tends to be deteriorated in tearing resistance and high-strain-region stress property.

In the dehydrating step (III-A), the set temperature of the inside of the barrel of the first uniaxial extruder (the heating temperature for the filler-containing rubber solidified product) is preferably from 160 to 220° C., more preferably from 180 to 200° C. to decrease the water content by percentage efficiently in the resultant rubber wet master batch while the heat capacity and mechanical energy applied thereto are restrained as much as possible.

In the natural rubber wet master batch obtained through the dehydrating step, the water content by percentage is preferably from 1 to 10%, more preferably from 1 to 8%.

Drying Plasticizing Step (III-B):

The drying plasticizing step (III-B) is a step of using a second uniaxial extruder to plasticize the natural rubber wet master batch while the master batch is heated up to 120 to 180° C., thereby producing the natural rubber wet master batch further decreased in water content by percentage. The second uniaxial extruder may be equivalent to the first uniaxial extruder. In the same manner as in the first uniaxial extruder, the second uniaxial extruder preferably has no pin portions in the barrel inner wall of its expander region.

In the drying plasticizing step (III-B), the set temperature of the inside of the barrel of the second uniaxial extruder (the heating temperature for the natural rubber wet master batch) is preferably from 160 to 220° C., more preferably from 160 to 200° C. to decrease the water content by percentage efficiently in the resultant rubber wet master batch while the heat capacity and mechanical energy applied thereto are restrained as much as possible.

In the drying plasticizing step (III-B), it is preferred that the mechanical energy applied to the natural rubber wet master batch in the second uniaxial extruder is 70 W/kg or less. This case finally gives, from the natural rubber wet master batch as a raw material, a vulcanized rubber excellent in tearing resistance and high-strain-region stress property.

In the natural rubber wet master batch obtained through the drying plasticizing step (III-B), the water content by percentage is preferably 0.9% or less.

When the natural rubber wet master batch is plasticized in the drying plasticizing step (III-B), the addition and incorporation of an anti-aging agent thereinto make it possible to disperse the anti-aging agent more evenly in the natural rubber wet master batch. The final vulcanized rubber can be favorably prevented, with a higher certainty, from being rubber-deteriorated. The anti-aging agent may be an anti-aging agent usable ordinarily for rubbers, and examples thereof include aromatic amine type anti-aging agents, amine-ketone type anti-aging agents, monophenolic type anti-aging agents, bisphenolic type anti-aging agents, polyphenolic type anti-aging agents, dithiocarbamic acid salt type anti-aging agents, and thiourea type anti-aging agents. These may be used alone or in the form of an appropriate mixture. The content of the anti-aging agent(s) is preferably from 0.3 to 3 parts by mass, more preferably from 0.5 to 1.5 parts by mass for 100 parts by mass of the rubber components (solid) in the rubber wet master batch.

Since the producing method according to the present embodiment has no cooling step between the dehydrating step (III-A) and the drying plasticizing step (III-B), the water content by percentage can be efficiently decreased in the resultant natural rubber wet master batch while the heat capacity and mechanical energy applied to the master batch are restrained as much as possible. The method for preventing the natural rubber wet master batch from being cooled between the dehydrating step (III-A) and the drying plasticizing step (III-B) may be, for example, a method of connecting the first and second uniaxial extruders to each other through a connecting tool, such as a heatable cylinder having a short barrel length, or a method of connecting the first and second uniaxial extruders directly to each other. In order to prevent the natural rubber wet master batch from being cooled, the following temperature is set preferably to 40° C. or higher, more preferably to 60° C. or higher, in particular preferably to 120° C. or higher: the temperature of the natural rubber wet master batch before the master batch is charged from the first uniaxial extruder into the connecting tool; or the temperature of the natural rubber wet master batch before the master batch is charged into the second uniaxial extruder when the first and second uniaxial extruders are connected directly to each other.

Shaping Plasticizing Step (III-C):

In the rubber composition producing method according to the present embodiment, the step (III) may have, after the drying plasticizing step (III-B), a shaping plasticizing step (III-C) of using a mixer further to plasticize the above-mentioned natural rubber wet master batch. The mixer is preferably, for example, an open roll or a uniaxial extruder. In the shaping plasticizing step (III-C) also, it is preferred that the mechanical energy applied to the natural rubber wet master batch in the mixer is 70 W/kg or less since this case is to make the vulcanized rubber to be finally obtained from the natural rubber wet master batch as a raw material excellent in tearing resistance and high-strain-region stress property. The shaping machine may be a baler. In the drying plasticizing step (III-B), the water content by percentage in the natural rubber wet master batch has been sufficiently decreased; accordingly, the water content by percentage in the natural rubber wet master batch obtained through the shaping plasticizing step (III-C) may be about 0.9% or less as in the case with the natural rubber wet master batch after the drying plasticizing step (III-B).

Dry-Mixing Step (IV):

In the dry-mixing step (IV), the natural rubber wet master batch is dry-mixed with a dry rubber made mainly of a polybutadiene rubber, and an oil. As a dry rubber other than the polybutadiene rubber, the same as described above as the different rubber may be optionally blended. In the dry-mixing step (IV), at least one of a plant granular material, a grain granular material, and a granular region of a grain core material may be blended into the rubber composition.

The plant granular material is a granular material obtained by pulverizing shells of seeds of a walnut, a camellia or the like, or nuclei of fruits of a peach, a Japanese apricot or the like by a known method, these shells or nuclei having a hardness larger than ices, i.e., a Mohs' hardness of 2 or more. The plant granular material is projected from the rubber surface to produce a road-surface scratching effect, thereby exhibiting an effect of preventing the rubber from slipping on ice road surfaces. In order for the plant granular material to ensure bondability onto the rubber, the material is preferably a plant granular material subjected to surface treatment for improving the rubber-bondability thereof. When the material drops away from the phase of the rubber, fine voids are generated to produce a water absorbing effect. When at least one of the plant granular material, the grain granular material, and the granular region of the grain core material is blended, the blend amount thereof is preferably from 0.5 to 10 parts by mass for 100 parts by mass of the rubber components in the rubber composition. Specific examples thereof include a pulverized material of nuts or shells of fruits such as a peach, Japanese apricot, walnut, ginkgo nut, peanut, or Japanese chestnut; grains such as rice, barley, wheat, foxtail millet, Japanese millet and corn; and core materials thereof.

The dry-mixing step (IV) further has at least a kneading step (IV-A) and a vulcanization-related blending agent kneading step (IV-B).

Kneading Step (IV-A):

The kneading step (IV-A) is a step of charging the polybutadiene rubber, the oil, and one or more optional blending agents other than any vulcanization-related blending agent into the natural rubber wet master batch obtained through the drying plasticizing step (III-B) or the shaping plasticizing step (III-C), and then using a mixing/dispersing device to knead all the components. Examples of the blending agent(s) include another rubber, stearic acid, zinc flower, an anti-aging agent, silica, a silane coupling agent, a wax, and a working aid. When the blending agent(s) is/are mixed with the rubber components in the kneading step (IV-A), for example, the following advantages are produced: a rubber product after the master batch is vulcanized is to be heightened in strength; the rubber is made good in rubber-kneading workability; and the rubber is prevented from being deteriorated by radicals generated by the cleavage of the rubber molecular chains. In the kneading step (IV-A), for example, a gear-engaging type Banbury mixer, a tangential line type Banbury mixer, or a kneader is usable. In particular, the use of a gear-engaging type Banbury mixer is preferred.

Vulcanization-Related Blending Agent Kneading Step (IV-B):

One or more vulcanization-related blending agents, such as a vulcanizer, for example, sulfur, and/or a vulcanization promoter, are charged into the rubber composition obtained through the kneading step (IV-A), and then the entire components are kneaded and mixed with each other. When the rubber composition obtained through the vulcanization-related blending agent kneading step (IV-B) is heated to a predetermined temperature or higher, the vulcanizer in the rubber composition reacts with the rubber molecules so that crosslinkage structures are formed between the rubber molecules. Thus, the molecules are made into a three-dimensional network to give rubber elasticity to the rubber composition.

It is sufficient that the sulfur is a sulfur species for ordinary rubbers. Examples thereof include powdery sulfur, precipitated sulfur, insoluble sulfur, and highly dispersed sulfur. The sulfur content in the rubber composition according to the present invention is preferably from 0.3 to 6 parts by mass for 100 parts by mass of the rubber components. If the sulfur content is less than 0.3 parts by mass, the vulcanized rubber is short in crosslinkage density to be lowered in rubber strength and others. If the sulfur content is more than 6.5 parts by mass, the vulcanized rubber is deteriorated, particularly, in both of heat resistance and endurance. In order for the vulcanized rubber to ensure rubber strength satisfactorily and be further improved in heat resistance and endurance, the sulfur content more preferably ranges from 1.5 to 5.5 parts by mass for 100 parts by mass of the rubber components.

The vulcanization promoter may be a vulcanization promoter commonly used for rubber vulcanization. Examples thereof include sulfenamide type vulcanization promoters, thiuram type vulcanization promoters, thiazole type vulcanization promoters, thiourea type vulcanization promoters, guanidine type vulcanization promoters, and dithiocarbamic acid salt type vulcanization promoters. These may be used alone or in the form of an appropriate mixture. The content of the vulcanization promoter(s) is preferably from 1 to 5 parts by mass, more preferably from 1.5 to 4 parts by mass for 100 parts by mass of the rubber components.

EXAMPLES

Hereinafter, this invention will be more specifically described by demonstrating examples thereof. Raw materials and devices used therein are as follows:
Used Raw Materials:
a) Carbon blacks:
  Carbon black "N339": "SEAST KH"; $N_2SA$: 91 $m^2/g$ (manufactured by Tokai Carbon Co., Ltd.),
  Carbon black "N234": "SEAST 7HM"; $N_2SA$: 119 $m^2/g$ (manufactured by Tokai Carbon Co., Ltd.), and
  Carbon black "N550": "SEAST SO"; $N_2SA$: 40 $m^2/g$ (manufactured by Tokai Carbon Co., Ltd.);
b) Dispersing solvent: Water;
c) Natural rubber latex:
  Natural rubber concentrated latex solution, manufactured by Regitex Co., Ltd. (DRC (dry rubber content)=60%), mass-average molecular weight (Mw)=236,000;
d) Solidifier: Formic acid (adjusted into a pH of 1.2 by diluting a 10% solution of a first class 85%-concentration agent) (manufactured by Nacalai Tesque, Inc.);
e) Natural rubber: RSS #3;
f) Polybutadiene rubber: "HIGHCIS BR" (manufactured by JSR Corporation;
g) Silica: "NIPSIL AQ" (manufactured by Nippon Silica Industrial Co., Ltd.);
h) Silane coupling agent: "Si75" (manufactured by Degussa);
i) Oils:
  Oil A: "PROCESS NC140"; pour point: 7.5° C., and aniline point: 91.2° C. (manufactured by JOMO),
  Oil B: "PROCESS P200"; pour point: −15° C., and aniline point: 102.3° C. (manufactured by JOMO), and
  Oil C: "PS-32"; pour point: −20° C., and aniline point: 110° C. (manufactured by Idemitsu Kosan Co., Ltd.),
j) Stearic acid: "LUNAC S-20" (manufactured by Kao Corporation);
k) Zinc flower:
  "Zinc flower class-1" (manufactured by Mitsui Mining & Smelting Co., Ltd.);
l) Anti-aging agent: "ANTIGEN 6C" (manufactured by Sumitomo Chemical Co., Ltd.);
m) Wax: "OZOACE 0355" (manufactured by Nippon Seiro Co., Ltd.);
n) Vulcanization promoter: "SOXINOL CZ" (manufactured by Sumitomo Chemical Co., Ltd.);
o) Sulfur: "Powdery sulfur" (manufactured by Tsurumi Chemical Industry Co., Ltd.);
p) Plant granular material: "SOFT GRIT #46" (manufactured by Nippon Walnut Co., Ltd.) treated with an ordinary RF adhesive; and
q) Granular material of a grain core material: CORN COBS GRIT 40/60 (corncob) manufactured by Nippon Walnut Co., Ltd.

Example 1

Natural rubber wet master batches were each produced by the following method:
Solidifying Step:
  Carbon black (N339) was added into a diluted natural rubber latex, the concentration therein being adjusted to 0.5% by mass, so as to give a carbon black concentration of 5% by mass. A device, ROBOMIX, manufactured by Primix Corp. was used to disperse the carbon black therein (ROBOMIX conditions: rotation at 9000 rpm for 30 minutes) to produce a slurry solution containing the carbon black to which natural rubber latex particles adhered (step (I)).

To the slurry solution produced in the step (I), which contained the natural-rubber-latex-particle-adhering carbon black, was added the rest of the natural rubber latex solution (the solid (rubber) concentration therein was adjusted to 25% by mass by the addition of water) to adjust the total of the solid (rubber) content therein and that in the natural rubber latex solution used in the step (I) to 50 parts by mass. Next, a mixer for household use, model SM-L56, manufactured by Sanyo Electric Co., Ltd. was used to mix these components with each other (mixer conditions: rotation at 11300 rpm for 30 minutes) to produce a carbon-black-containing natural rubber latex solution (step (II)). In the carbon-black-containing natural rubber latex solution, 25 parts by mass of the carbon black was contained for 50 parts by mass of the rubber components (solid).

A 10%-by-mass solution of formic acid in water as a solidifier was added to the carbon-black-containing natural rubber latex solution produced in the step (II) until the pH of the whole turned to 4 (step (III)). A screen (φ2 punching, manufactured by Toyo Screen Kogyo Co., Ltd.) was used to remove water from the solution containing the resultant carbon-black-containing natural rubber solidified product, thereby producing a carbon-black-containing rubber solidified product having a water content of 65.1%. In order to further decrease the water content by percentage, the solidified product may be centrifuged. An instrument, model H-22 (BS-030) manufactured by Kokusan Co., Ltd., may be used to subject the solidified product to solid-liquid separation (separating conditions: rotation at 29000 rpm for 10 minutes), thereby producing a filler-containing rubber solidified product having a water content of 46.20.

Dehydrating Step (III-A) and Drying Plasticizing Step (III-B):
  A first uniaxial extruder (product number: model V-02, manufactured by Suehiro EPM Corporation; barrel diameter: 90 mm; "barrel length"/"barrel diameter" (L/D)=8.6; and slit widths between the barrel and the screw: 0.7 mm, 0.5 mm, and 0.2 mm) was connected directly to a second uniaxial extruder (a uniaxial extruder identical with the first uniaxial extruder). The natural rubber wet master batch was subjected to the above-defined dehydrating step and drying plasticizing step while the following were each set into a value described in Table 1: the heating temperature, and the mechanical energy applied to the natural rubber wet master batch (WMB) in each of the steps; and the water content by percentage in the natural rubber wet master batch obtained after each of the steps. As shown in Table 1, the temperature change between the dehydrating step (III-A) and the drying plasticizing step (III-B) was only 30° C. Thus, it is understood that the present process had no cooling step between the dehydrating step (III-A) and the drying plasticizing step (III-B).

Dry-Mixing Step (IV):
  Into a B-type Banbury mixer (manufactured by Kobe Steel, Ltd.) were charged each of the natural rubber wet master batches obtained through the drying plasticizing step (III-B), a polybutadiene rubber, an oil, and various blending agents shown in Table 1, and then these components were mixed with each other to produce a rubber composition. This rubber composition was vulcanized at 150° C. for 30 minutes to produce a vulcanized rubber.
Rubber Hardness of Vulcanized Rubber:
  The rubber hardnesses of the vulcanized rubber were measured at 23° C. and −5° C., respectively, in accordance with JIS K6253.

Low-Temperature Performance Index:

A viscoelasticity meter manufactured by Toyo Seiki Seisaku-sho, Ltd. was used to measure the storage elastic moduli E' of the rubber composition at respective temperatures of −5° C. and −25° C. and at a frequency of 10 Hz, a static strain of 10%, and a dynamic strain of ±0.25%. The reciprocal number of each of the resultant values was shown as an index under the condition that the value of Comparative Example 1 was regarded as 100. As the index is larger, the composition is smaller in storage elastic modulus E' so that the composition product is wider in contact area at low temperatures to be better in low-temperature performance.

Braking Performance on Ice Road Surface (Ice Braking Performance):

The 2000-cc FF car was run at a speed of 40 km/h on an ice road surface (−3±3° C.), and then the braking distance thereof was measured (the average value under the condition that n was 10) when the car was subjected to ABS operation. The resultant value was shown as an index under the condition that the value of Comparative Example 1 was regarded as 100. As the numeral value is larger, the rubber composition is better in that the braking distance is shorter.

Low-Thermogenic Performance of Vulcanized Rubber:

In accordance with JIS K6265, the low-thermogenic performance of the produced vulcanized rubber was evaluated on the basis of the loss tangent tanδ thereof. The tanδ was measured at 50 Hz, 80° C. and a dynamic strain of 2%, using a rheospectrometer, E4000 manufactured by UBM, and the measured value was converted to an index. The index was an index under the condition that the value of Comparative Example 1 was regarded as 100, and the index was used to make an evaluation. As the numerical value is smaller, the vulcanized rubber is lower-thermogenic to be better.

Abrasion Resistance Performance:

In accordance with JIS K6264, the rubber composition was measured at a slip ratio of 30%, an applied load of 40 N and a dropping sand amount of 20 g/minute, and then evaluated on the basis of the measured result. The resultant value was shown as an index under the condition that the value of Comparative Example 1 was regarded as 100. As the numeral value is larger, the rubber composition is better in abrasion resistance.

TABLE 1

| | | Comparative Example 1 | Comparative Example 2 | Comparative Example 3 | Comparative Example 4 | Example 1 | Example 2 | Example 3 | Example 4 | Example 5 |
|---|---|---|---|---|---|---|---|---|---|---|
| Step (I) | | | | | | | | | | |
| Carbon black | Species | — | N339 | N339 | N339 | N339 | N339 | N550 | N339 | N339 |
| | Blend amount for 100 parts by mass of rubber components | — | 50 | 50 | 50 | 50 | 50 | 70 | 50 | 50 |
| Added rubber latex species | Rubber content in NR | — | 5 | 5 | 5 | 5 | 5 | 5 | 5 | 5 |
| | "Added rubber latex concentration" (solid (rubber) concentration (% by mass)) | — | 0.5% | 0.5% | 0.5% | 0.5% | 0.5% | 0.5% | 0.5% | 0.5% |
| Step (II) | | | | | | | | | | |
| Added rubber latex species | Rubber content in NR | — | 95 | 95 | 95 | 95 | 95 | 95 | 95 | 95 |
| | "Added rubber latex concentration" (solid (rubber) concentration (% by mass)) | — | 25% | 25% | 25% | 25% | 25% | 25% | 25% | 25% |
| Rubber amount in rubber wet master batch (the number of parts by mass when the total amount of rubber components was regarded as 100 parts by mass) | | — | 100 | 100 | 100 | 100 | 100 | 100 | 100 | 100 |
| Step (III-A) | | | | | | | | | | |
| Used mixer | | — | Uniaxial extruder | Uniaxial extruder | Uniaxial extruder | Uniaxial extruder | Uniaxial extruder | Uniaxial extruder | Uniaxial extruder | Uniaxial extruder |
| Heating temperature | | — | 160° C. | 160° C. | 160° C. | 160° C. | 160° C. | 160° C. | 160° C. | 160° C. |
| Water content (%) | | — | 5.00 | 5.00 | 5.00 | 5.00 | 5.00 | 5.00 | 5.00 | 5.00 |
| Mechanical energy (Wh/kg) applied to WMB | | — | 93 | 93 | 93 | 93 | 93 | 93 | 93 | 93 |
| Step (III-B) | | | | | | | | | | |
| Used mixer | | — | Uniaxial extruder | Uniaxial extruder | Uniaxial extruder | Uniaxial extruder | Uniaxial extruder | Uniaxial extruder | Uniaxial extruder | Uniaxial extruder |
| Heating temperature | | — | 160° C. | 160° C. | 160° C. | 160° C. | 160° C. | 160° C. | 160° C. | 160° C. |
| Water content (%) | | — | 0.84 | 0.84 | 0.84 | 0.84 | 0.84 | 0.84 | 0.84 | 0.84 |
| Mechanical energy (Wh/kg) applied to WMB | | — | 61 | 61 | 61 | 61 | 61 | 61 | 61 | 61 |
| Step (III-C) | | | | | | | | | | |
| Used mixer | | — | Uniaxial extruder | Uniaxial extruder | Uniaxial extruder | Uniaxial extruder | Uniaxial extruder | Uniaxial extruder | Uniaxial extruder | Uniaxial extruder |
| Heating temperature | | — | 160° C. | 160° C. | 160° C. | 160° C. | 160° C. | 160° C. | 160° C. | 160° C. |
| Water content (%) | | — | 0.83 | 0.83 | 0.83 | 0.83 | 0.83 | 0.83 | 0.83 | 0.83 |
| Mechanical energy (Wh/kg) applied to WMB | | — | 63 | 63 | 63 | 63 | 63 | 63 | 63 | 63 |

TABLE 1-continued

| | Comparative Example 1 | Comparative Example 2 | Comparative Example 3 | Comparative Example 4 | Example 1 | Example 2 | Example 3 | Example 4 | Example 5 |
|---|---|---|---|---|---|---|---|---|---|
| Step (IV) | | | | | | | | | |
| NR | 50 | — | — | — | — | — | — | — | — |
| WMB | — | 75 | 75 | 75 | 75 | 75 | 85 | 75 | 75 |
| BR | 50 | 50 | 50 | 50 | 50 | 50 | 50 | 50 | 50 |
| Carbon black Species | N339 | — | — | — | — | — | — | — | — |
| Blend amount for 100 parts by mass of rubber components | 25 | — | — | — | — | — | — | — | — |
| Silica | 25 | 25 | 25 | 25 | 25 | 25 | 25 | 25 | 25 |
| Si75 | 2.0 | 2.0 | 2.0 | 2.0 | 2.0 | 2.0 | 2.0 | 2.0 | 2.0 |
| Oil A | 20 | 20 | — | — | — | — | — | — | — |
| Oil B | — | — | 10 | 50 | 20 | — | 20 | 35 | 20 |
| Oil C | — | — | — | — | — | 20 | — | — | — |
| Stearic acid | 2 | 2 | 2 | 2 | 2 | 2 | 2 | 2 | 2 |
| Zinc flower | 2 | 2 | 2 | 2 | 2 | 2 | 2 | 2 | 2 |
| Anti-aging agent | 2 | 2 | 2 | 2 | 2 | 2 | 2 | 2 | 2 |
| Wax | 2 | 2 | 2 | 2 | 2 | 2 | 2 | 2 | 2 |
| Plant granular material | 2 | 2 | 2 | 2 | 2 | 2 | 2 | 2 | — |
| Granular material of grain core material | — | — | — | — | — | — | — | — | 2 |
| Vulcanization promoter | 1.5 | 1.5 | 1.5 | 1.5 | 1.5 | 1.5 | 1.5 | 1.5 | 1.5 |
| Sulfur | 2.1 | 2.1 | 2.1 | 2.1 | 2.1 | 2.1 | 2.1 | 2.1 | 2.1 |
| Vulcanized rubber properties | | | | | | | | | |
| Hardness (23° C.) | 51 | 48 | 49 | 42 | 47 | 47 | 47 | 47 | 47 |
| Hardness (−5° C.) | 61 | 55 | 58 | 45 | 51 | 50 | 50 | 51 | 51 |
| Low-temperature performance indexes E' (−5° C.) | 100 | 96 | 97 | 92 | 95 | 95 | 96 | 95 | 95 |
| E' (−25° C.) | 100 | 107 | 87 | 147 | 140 | 145 | 140 | 145 | 140 |
| Ice braking performance index | 100 | 100 | 92 | 117 | 125 | 130 | 125 | 130 | 125 |
| Low-thermogenic performance (tan δ) | 100 | 92 | 87 | 110 | 89 | 89 | 90 | 90 | 89 |
| Abrasion resistance | 100 | 100 | 105 | 80 | 97 | 97 | 97 | 98 | 97 |

It is understood from the results in Table 1 that the vulcanized rubber from the rubber composition according to each of Examples 1 to 4 was largely decreased in E' in the range of low temperatures, and was further improved in ice braking performance and low-thermogenic performance. However, the vulcanized rubber from the rubber composition according to each of Comparative Examples 2 and 3 was deteriorated in ice braking performance and low-thermogenic performance, and the vulcanized rubber from the rubber composition of Comparative Example 4 was deteriorated in low-thermogenic performance and abrasion resistance.

The invention claimed is:

1. A method for producing a rubber composition comprising a natural rubber wet master batch obtained by use of a carbon black, a dispersing solvent and a natural rubber latex as raw materials, a dry rubber made mainly of a polybutadiene rubber, and an oil, comprising:

step (I) in which when the carbon black is dispersed into the dispersing solvent, at least one portion of the natural rubber latex is added thereto, thereby producing a slurry solution containing the carbon black to which natural rubber latex particles adhere, step (II) of mixing this slurry solution with the rest of the natural rubber latex solution to produce a natural rubber latex solution containing the just-above described natural-rubber-latex-particle-adhering carbon black, step (III) of solidifying the rubber latex solution containing the natural-rubber-latex-particle-adhering carbon black to produce the carbon-black-containing natural rubber solidified product, and then drying the solidified product to produce a natural rubber wet master batch, and step (IV) of dry-mixing this natural rubber wet master batch with the dry rubber, which is made mainly of the polybutadiene rubber, and the oil, wherein when the total amount of rubber components in the rubber composition is regarded as 100 parts by mass, the natural rubber is contained in an amount of 50 parts or more by mass, and the polybutadiene rubber is contained in an amount of 20 to 50 parts by mass, and the oil has a pour point of −10° C. or lower, and an aniline point of 90° C. or higher, and the blend amount of the oil is from 15 to 40 parts by mass for 100 parts by mass of the rubber components.

2. The rubber composition producing method according to claim 1, wherein the step (III) has at least a dehydrating step (III-A) of using a first uniaxial extruder to dehydrate the carbon-black-containing natural rubber solidified product while the product is heated up to 100 to 180° C., thereby producing a natural rubber wet master batch, and a drying plasticizing step (III-B) of using a second uniaxial extruder to plasticize the natural rubber wet master batch while the master batch is heated up to 120 to 180° C., thereby producing the just-above described natural rubber wet master batch further decreased in water content by percentage, the rubber composition producing method having no cooling step between the dehydrating step (III-A) and the drying plasticizing step (III-B).

3. The rubber composition producing method according to claim 2, wherein the water content by percentage of the natural rubber wet master batch obtained through the dehydrating step (III-A) is from 1 to 10%.

4. The rubber composition producing method according to claim 2, wherein the water content by percentage of the natural rubber wet master batch obtained through the drying plasticizing step (M-B) is 0.9% or less.

5. The rubber composition producing method according to according to claim 2, wherein in the drying plasticizing step (III-B), a mechanical energy of 70 W/kg or less is applied to the rubber wet master batch inside the second uniaxial extruder.

6. The rubber composition producing method according to according to claim 2, wherein the first uniaxial extruder and the second uniaxial extruder are connected to each other.

7. The rubber composition producing method according to according to claim 2, wherein when the natural rubber wet master batch is plasticized in the drying plasticizing step (M-B), an anti-aging agent is added and blended thereinto.

8. The rubber composition producing method according to according to claim 2, wherein the step (III) comprises, after the drying plasticizing step (III-B), a shaping plasticizing step (III-C) of using a mixer further to plasticize the natural rubber wet master batch.

9. The rubber composition producing method according to claim 8, wherein in the shaping plasticizing step (III-C), a mechanical energy of 70 W/kg or less is applied to the rubber wet master batch inside the mixer.

10. The rubber composition producing method according to claim 8, wherein the mixer is an open roll or a uniaxial extruder.

* * * * *